United States Patent
Nakashima et al.

(10) Patent No.: US 12,093,881 B2
(45) Date of Patent: Sep. 17, 2024

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Toyokazu Nakashima, Nagoya (JP); Shunsuke Sagara, Nisshin (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/146,655

(22) Filed: Dec. 27, 2022

(65) Prior Publication Data
US 2023/0297937 A1    Sep. 21, 2023

(30) Foreign Application Priority Data
Mar. 16, 2022   (JP) ................................. 2022-041107

(51) Int. Cl.
*G06Q 10/0833* (2023.01)
*G01C 21/34* (2006.01)

(52) U.S. Cl.
CPC ..... *G06Q 10/0833* (2013.01); *G01C 21/3469* (2013.01)

(58) Field of Classification Search
CPC ......................... G06Q 10/0833; G01C 21/3469
USPC .......................................................... 705/333
See application file for complete search history.

(56) References Cited

U.S. PATENT DOCUMENTS

| | | | |
|---|---|---|---|
| 2012/0023032 A1* | 1/2012 | Visdomini | G06Q 10/08355 705/338 |
| 2017/0063924 A1* | 3/2017 | Dick | H04L 63/0272 |
| 2022/0067751 A1* | 3/2022 | Sanchez | G06Q 10/08345 |

FOREIGN PATENT DOCUMENTS

JP    2011191828 A    9/2011

OTHER PUBLICATIONS

"Reducing greenhouse gas emissions of a heterogeneous vehicle fleet" Published by Springer Link (Year: 2014).*

* cited by examiner

*Primary Examiner* — Zeina Elchanti
(74) *Attorney, Agent, or Firm* — SoraIP, Inc.

(57) ABSTRACT

An information processing device determines whether or not an emission amount of a greenhouse gas generated for delivering a package to a predetermined user satisfies a predetermined criterion, based on first data related to a delivery of the package, and generates information on the emission amount to be presented to the user in a case where the predetermined criterion is satisfied.

18 Claims, 13 Drawing Sheets

FIG. 4

DELIVERY INSTRUCTION DATA

| PACKAGE ID | CONSIGNEE ID | DELIVERY OPTION | COMMODITY ID | NUMBER | SHIPMENT SOURCE | DELIVERY DESTINATION | | | |
|---|---|---|---|---|---|---|---|---|---|
| | | | | | | NAME | ADDRESS | PHONE NUMBER | |
| P001 | ... | NORMAL | ... | ... | ... | ... | ... | ... | ... |
| ... | ... | ... | ... | ... | ... | ... | ... | ... | ... |

FIG. 7

RUNNING PLAN DATA

| RUNNING ID | BUSINESS OPERATOR ID | DEPARTURE DATE AND TIME | VEHICLE ID | TRAVELING ROUTE | ID OF LOADED PACKAGE |
|---|---|---|---|---|---|
| 1 | B001 | ... | V001 | ... | P001,P002... |
| 2 | B001 | ... | V002 | ... | ... |
| 3 | B001 | ... | V003 | ... | ... |
| ... | ... | ... | ... | ... | ... |

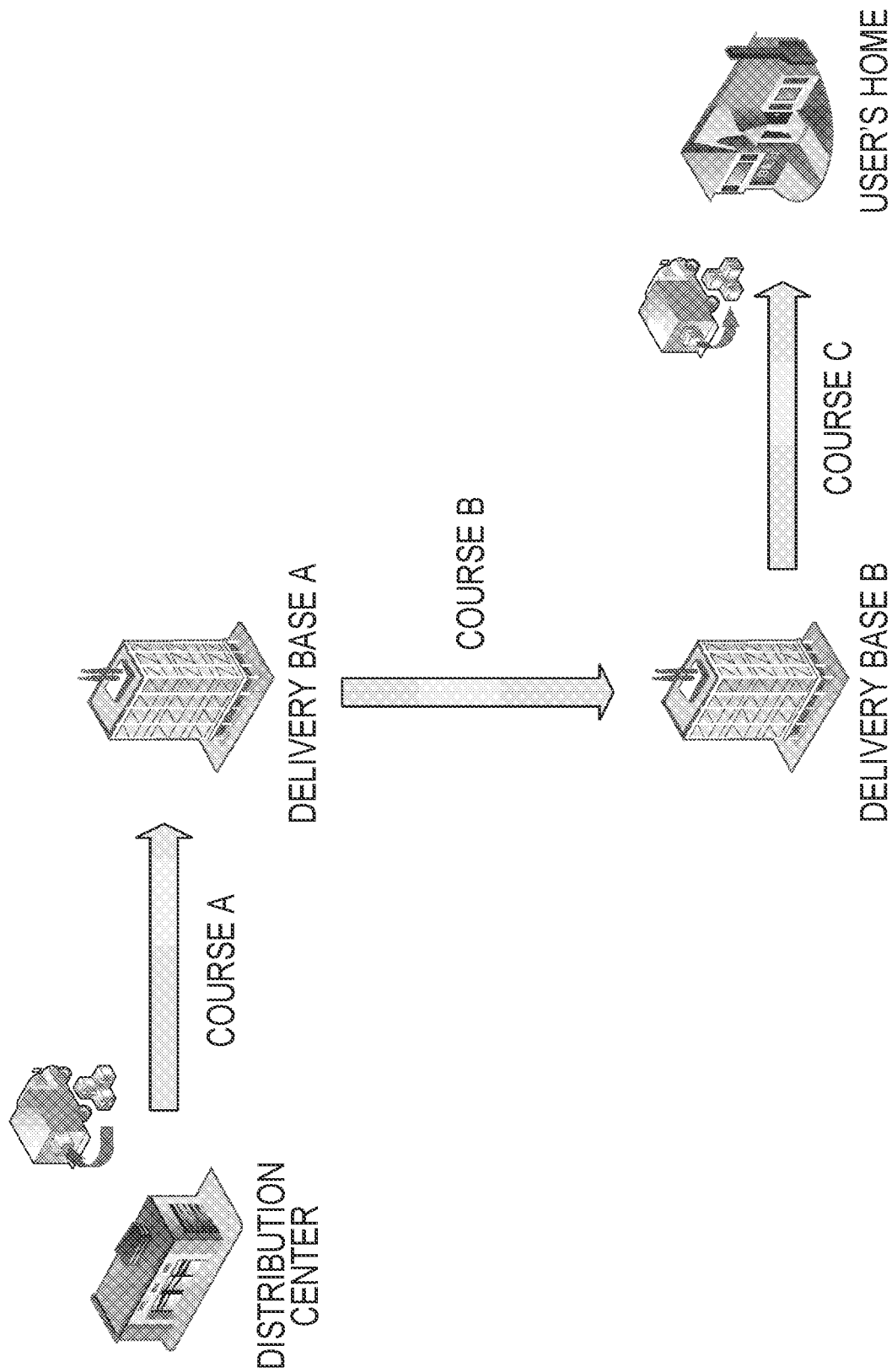

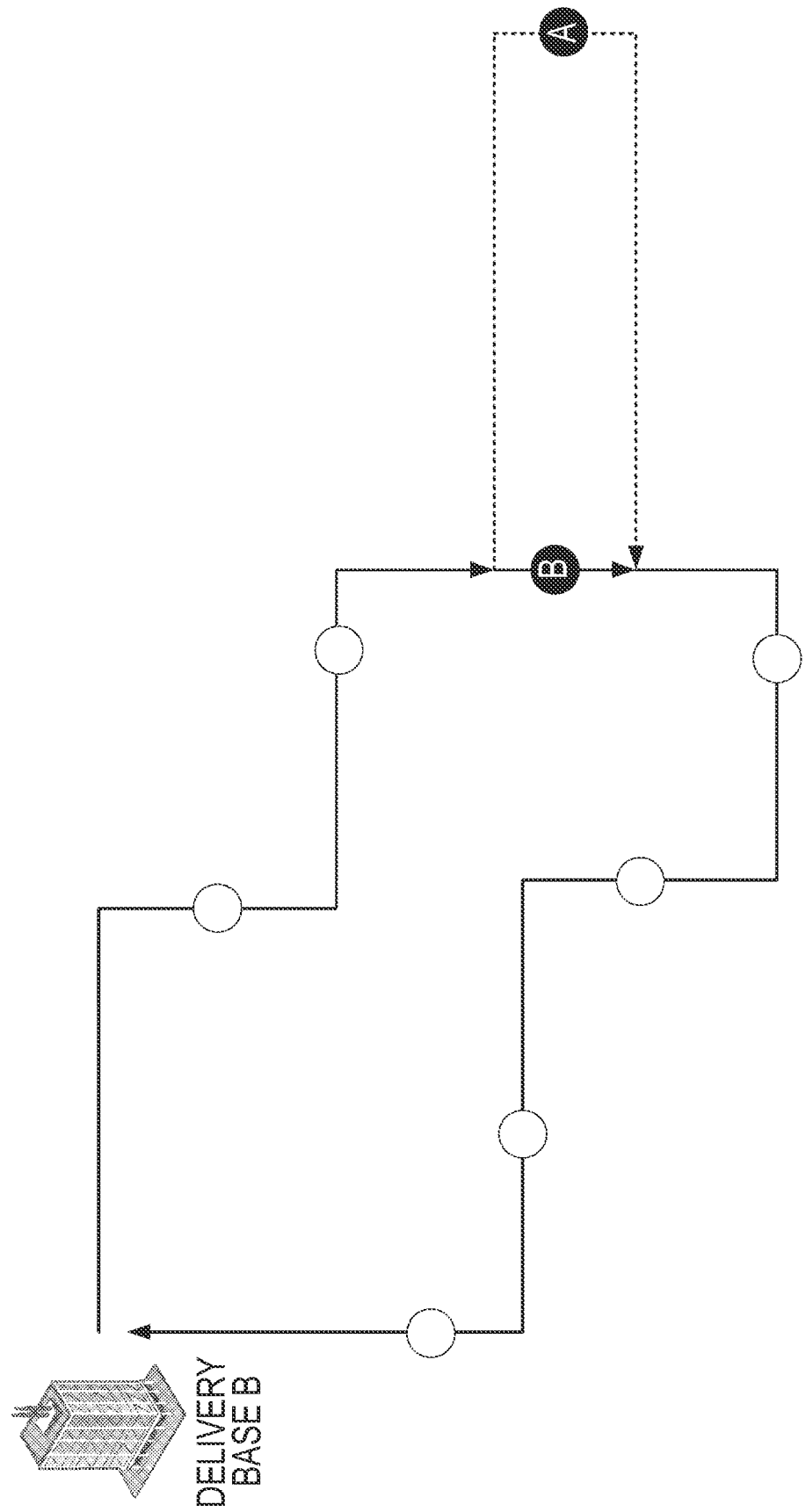

FIG. 11

```
CO2 HAS BEEN REDUCED

CO2 EMITTED DUE TO DELIVERY
OF THIS PACKAGE HAS BEEN REDUCED
BY O.O g AS COMPARED WITH AVERAGE
VALUE IN PAST ONE MONTH
```

```
CO2 HAS BEEN REDUCED

AVERAGE VALUE OF CO2 EMITTED
DUE TO DELIVERIES OF PACKAGES
TO MR/MS OO IN PAST ONE WEEK
HAS BEEN REDUCED BY O.O g
AS COMPARED WITH AVERAGE VALUE
IN PAST ONE MONTH
```

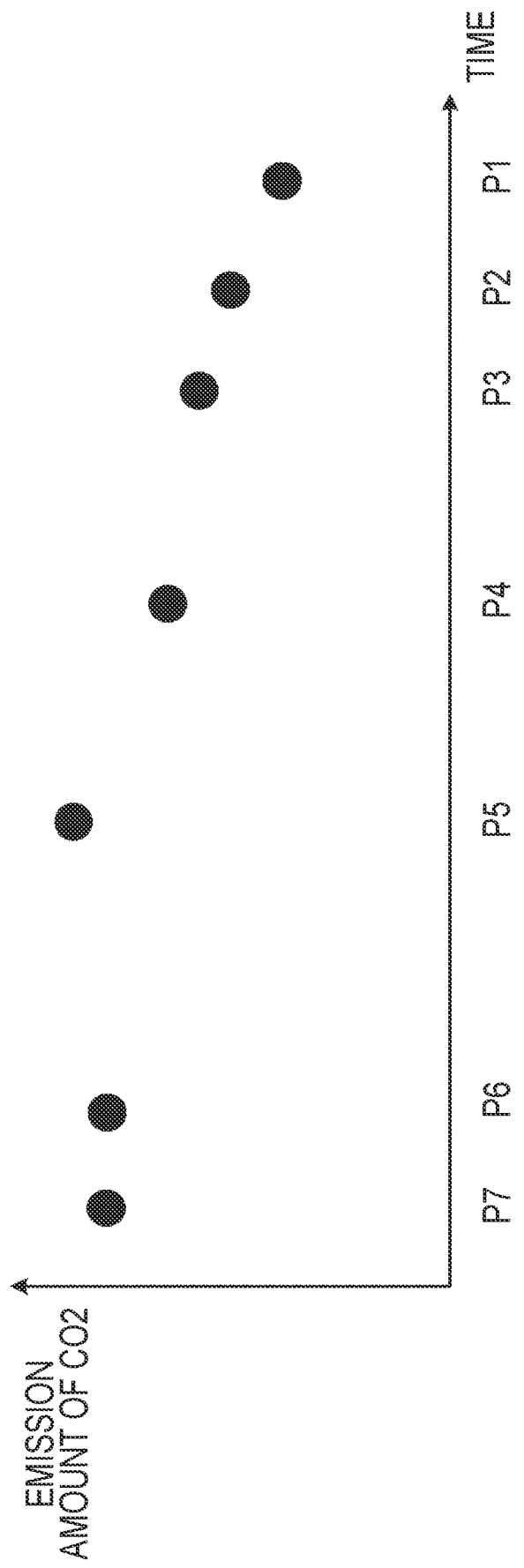

INFORMATION PROCESSING DEVICE AND INFORMATION PROCESSING METHOD

CROSS-REFERENCE TO RELATED APPLICATION

This application claims priority to Japanese Patent Application No. 2022-041107 filed on Mar. 16, 2022, incorporated herein by reference in its entirety.

BACKGROUND

1. Technical Field

The present disclosure relates to suppression of emission of a greenhouse gas.

2. Description of Related Art

Efforts have been made to reduce a greenhouse gas including carbon dioxide. In this regard, for example, Japanese Unexamined Patent Application Publication No. 2011-191828 (JP 2011-191828 A) discloses a label issuing device that prints a label for presenting an emission amount of a greenhouse gas to a consumer.

SUMMARY

The present disclosure is to encourage a user to engage in consumption behavior that reduces a greenhouse gas.

A first aspect of an embodiment of the present disclosure relates to an information processing device including a controller. The controller is configured to execute determining whether or not an emission amount of a greenhouse gas generated for delivering a package to a predetermined user satisfies a predetermined criterion, based on first data related to a delivery of the package. The controller is configured to execute generating information on the emission amount to be presented to the user in a case where the predetermined criterion is satisfied.

A second aspect of an embodiment of the present disclosure relates to an information processing method executed by a computer. The information processing method includes determining whether or not an emission amount of a greenhouse gas generated for delivering a package to a predetermined user satisfies a predetermined criterion, based on first data related to a delivery of the package. The information processing method includes generating information on the emission amount to be presented to the user in a case where the predetermined criterion is satisfied.

In addition, a third aspect relates to a program causing a computer to execute the method described above and a computer-readable storage medium that non-transitorily stores the program.

According to the present disclosure, the user can be encouraged to engage in the consumption behavior that reduces the greenhouse gas.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is an example of delivery instruction data generated by the EC server;

FIG. 7 is an example of running plan data generated by the delivery server;

FIG. 8 is a diagram for describing a delivery route of a package;

FIG. 9 is a diagram for describing the delivery route of the package;

FIG. 11 is an example of a label to be attached to the package;

FIG. 14 is an example of time-series data in a third embodiment.

DETAILED DESCRIPTION OF EMBODIMENTS

Figure 1:
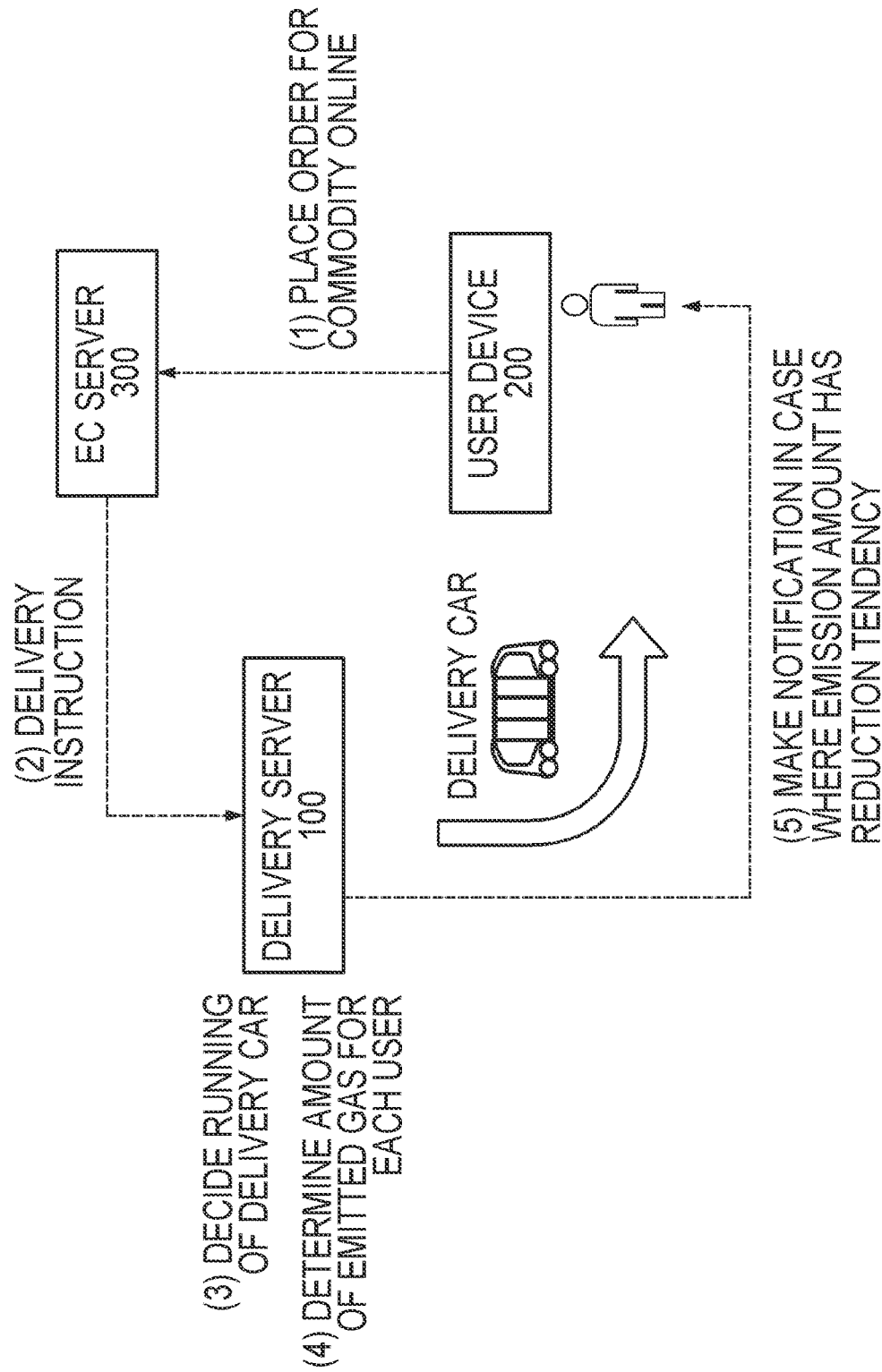
FIG. 1 is a schematic diagram of a delivery system according to an embodiment.

In recent years, efforts have been made to reduce a greenhouse gas. In particular, there is a movement to reduce a greenhouse gas (typically carbon dioxide, hereinafter, referred to as $CO_2$) to be emitted by a vehicle for transporting an item. In order to reduce the $CO_2$ to be emitted, there are methods, such as selecting a delivery method with less $CO_2$, reducing a redelivery, and reducing the number of the deliveries themselves.

For example, there is a system that calculates an amount of $CO_2$ generated when a commodity is transported and presents the calculated amount of $CO_2$ to a consumer using a label or the like. However, such a system can solely calculate the amount of $CO_2$ corresponding to one commodity, and cannot notify a corresponding user that "$CO_2$ has been reduced due to a change in consumption behavior of the user". For example, the user cannot be notified that $CO_2$ has a reduction tendency due to the change in the consumption behavior of the user, such as "reducing the number of times of purchase of the commodity through mail-order sales" or "selecting the delivery method with less emission amount". In a case where such a notification is possible, the user can be motivated to reduce the greenhouse gas, such as $CO_2$.

An information processing device according to the present disclosure solves such a problem.

One aspect of the present disclosure relates to the information processing device.

Specifically, the information processing device includes a controller configured to execute determining whether or not an emission amount of a greenhouse gas generated for delivering a package to a predetermined user satisfies a predetermined criterion, based on first data related to a delivery of the package, and generating information on the emission amount to be presented to the user in a case where the predetermined criterion is satisfied.

The first data is data related to the delivery of the package, and is typically data for calculating the amount of the greenhouse gas to be emitted for delivering the package. The first data may be, for example, data related to running of the vehicle (delivery car) that delivers the package. Examples of such data include information on the delivery car, information on a traveling route, information on a traveling distance, information on the loaded package. In addition, the first data may also include the amount of the greenhouse gas emitted by the delivery car per running.

The first data can be any data as long as the amount of the greenhouse gas generated per package can be calculated. In a case where the information processing device is a device that manages the delivery of the package, the device itself may generate the first data. In addition, the first data may be received via a network or the like from an external device that manages the delivery of the package (or the running of the delivery car).

The controller determines whether or not the emission amount of the greenhouse gas generated for delivering the package to the predetermined user satisfies the predetermined criterion, based on the first data.

For example, the controller obtains a change tendency of the emission amount of the greenhouse gas emitted for delivering the package to the predetermined user, and determines whether or not there is a predetermined tendency (for example, reduction tendency). As a result, a determination can be made as to whether or not "the amount of the greenhouse gas emitted for the user has the reduction tendency (due to the consumption behavior of the user)".

In order to make this determination, the information processing device may accumulate the first data and calculate the emission amount of the greenhouse gas for each of a plurality of package accepted by the user in the past.

The predetermined criterion may relate to the change tendency of the emission amount of the greenhouse gas in time series. The change tendency may be determined, for example, based on a result of the delivery included in a plurality of periods. For example, based on the emission amount in a first period corresponding to most recent one or more deliveries and the emission amount in a second period corresponding to one or more deliveries and included in a past predetermined period, the change tendency can be determined.

The controller may make a notification to the user based on a result of the determination. The notification may be made, for example, by attaching the label to the package that is a delivery target. For example, in the predetermined period including a delivery timing of the package that is a target, a text for announcing that the emission amount of the greenhouse gas has the reduction tendency can be printed on the label. The controller may command printing the label to a device that prints such a label.

In addition, the controller may also transmit the information on the emission amount of the greenhouse gas to a terminal associated with the user, for example. The information may include a specific numerical value related to the reduction amount of the greenhouse gas or the like.

In the following, embodiments of the present disclosure will be described based on the drawings. The configurations of the embodiments described below are examples, and the present disclosure is not limited to the configurations of the embodiments.

First Embodiment

An outline of a delivery system according to a first embodiment will be described with reference to FIG. 1. The delivery system according to the present embodiment includes a delivery server 100, a user device 200, and an EC server 300.

The user device 200 is a computer owned by the user. Via the user device 200, the user can access the EC server 300 that provides a mail-order-sales service and place an order (purchase application) for the commodity.

The EC server 300 is a device that accepts the order for the commodity from the user via a network (for example, the Internet). The EC server 300 incorporates a web server, and the user can log in to an EC site via a web browser and place the order for the commodity. The EC server 300 is managed by a business operator who conducts a mail-order-sales business.

The EC server 300 transmits data for making a delivery instruction for the package to the delivery server 100 in a case where the order for the commodity is placed.

The delivery server 100 is a server device that manages the delivery of the package sold by the EC server 300. The delivery server 100 may be, for example, a device managed by a predetermined transport business operator, or may be a device under the jurisdiction of a plurality of transport business operators. The delivery server 100 receives the data related to the delivery instruction for the package from the EC server 300, and decides the running of the delivery car based on the data.

Further, the delivery server 100 calculates the emission amount of $CO_2$ generated for delivering the package for each user, based on a running history of the delivery car. The calculation is executed, for example, in time series. As a result, for a certain user, for example, a determination can be made as to whether or not the emission amount of $CO_2$ has the reduction tendency.

In addition, the delivery server 100 notifies the user of which the emission amount of $CO_2$ is determined to have the reduction tendency. For example, the notification may be transmitted to the user device 200, or may be made by attaching the label (sticker) to the package to be delivered to the user.

Figure 2:
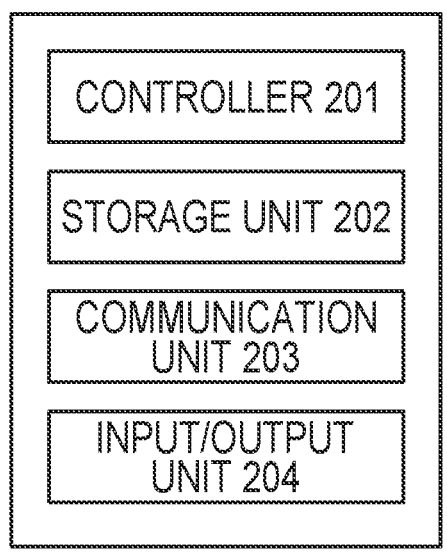
FIG. 2 is a block diagram schematically showing an example of a configuration of a user device 200.

FIG. 2 is a diagram showing in more detail the constituent elements of the user device 200 according to the present embodiment.

The user device 200 is, for example, a computer used by an individual, such as a personal computer, a smartphone, a mobile phone, a tablet computer, or a personal information terminal. The user device 200 includes a controller 201, a storage unit 202, a communication unit 203, and an input/output unit 204.

The controller 201 is an arithmetic device that administers the control executed by the user device 200. The controller 201 can be realized by an arithmetic processing device, such as a central processing unit (CPU).

The controller 201 executes a function of accessing the EC server 300 and executing an interaction. The function may be realized by a web browser operated on the user device 200.

The storage unit 202 includes a main storage device and an auxiliary storage device. The main storage device is a memory in which a program executed by the controller 201 or data used in the control program is expanded. The auxiliary storage device is a device in which the program executed by the controller 201 or the data used in the control program is stored. The auxiliary storage device may store the program that is packaged as an application to be executed by the controller 201. In addition, an operating system for executing these applications may be stored. The program stored in the auxiliary storage device is loaded into the main storage device and executed by the controller 201 to execute processing described below.

The main storage device may include a random access memory (RAM) or a read only memory (ROM). In addition, the auxiliary storage device may include an erasable programmable ROM (EPROM) or a hard disk drive (HDD). Further, the auxiliary storage device may include a removable medium, that is, a portable recording medium.

The communication unit 203 is a wireless communication interface for connecting the user device 200 to the network. The communication unit 203 is configured to communicate with the EC server 300 via, for example, a wireless LAN, a 3G, an LTE, a 5G, or other mobile communication services.

The input/output unit 204 is a unit that accepts an input operation executed by the user and presents the information to the user. In the present embodiment, the input/output unit 204 is formed of one touch panel display. Specifically, the input/output unit 204 is configured by a touch panel and control means thereof, and a liquid crystal display and control means thereof.

Figure 3:
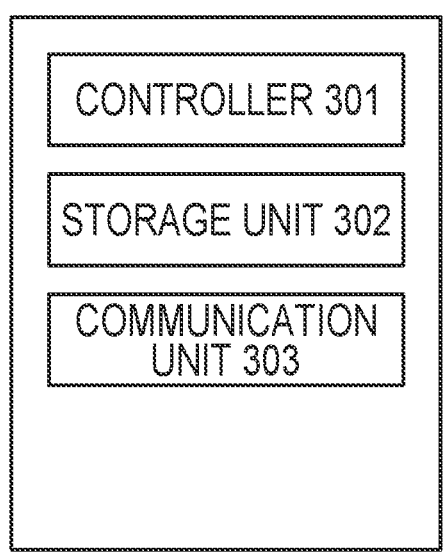
FIG. 3 is a block diagram schematically showing an example of a configuration of an EC server 300.

Next, the EC server 300 will be described. FIG. 3 is a system configuration diagram of the EC server 300 in the first embodiment.

The EC server 300 can be configured as a computer including a processor, such as a CPU or a GPU, a main storage device, such as a RAM or a ROM, and an auxiliary storage device, such as an EPROM, a hard disk drive, or a removable medium.

The EC server 300 includes a controller 301, a storage unit 302, and a communication unit 303.

The controller 301 is an arithmetic device that administers the control executed by the EC server 300. The controller 301 can be realized by an arithmetic processing device, such as a CPU.

The controller 301 communicates with the user device 200 and provides a service for accepting the order for the commodity. The controller 301 can execute the service by the web server.

For example, the controller 301 executes processing of communicating with a database that manages a stock and accepting the order via a predetermined interface, and processing of generating delivery instruction data in accordance with a content of the order. The delivery instruction data is data for instructing the delivery server 100 to deliver the package.

FIG. 4 is an example of the delivery instruction data generated by the controller 301. The delivery instruction data includes information on an identifier of the package, an identifier of a consignee, a delivery option, a identifier of the commodity, number, a shipment source, details of the consignee, and the like. The shipment source stores an identifier of a place (for example, distribution center) in which the package is dispatched.

The generated delivery instruction data is transmitted to the delivery server 100.

The storage unit 302 includes a main storage device and an auxiliary storage device. The main storage device is a memory in which a program executed by the controller 301 or data used in the control program are expanded. The auxiliary storage device is a device in which the program executed by the controller 301 or the data used in the control program is stored.

The storage unit 302 may store the database (stock database) for managing the stock of the commodity. The stock database may include information for identifying the commodity, a location of a commodity stock (for example, identifier of the distribution center), the number of the stocks, a sales price, and the like. The controller 301 can determine whether or not to place the order by referring to the database. In addition, the controller 301 can specify the shipment source of the commodity by referring to the database.

The communication unit 303 is a communication interface for connecting the EC server 300 to the network. The communication unit 303 includes, for example, a network interface board or a wireless communication interface for wireless communication.

Figure 5:
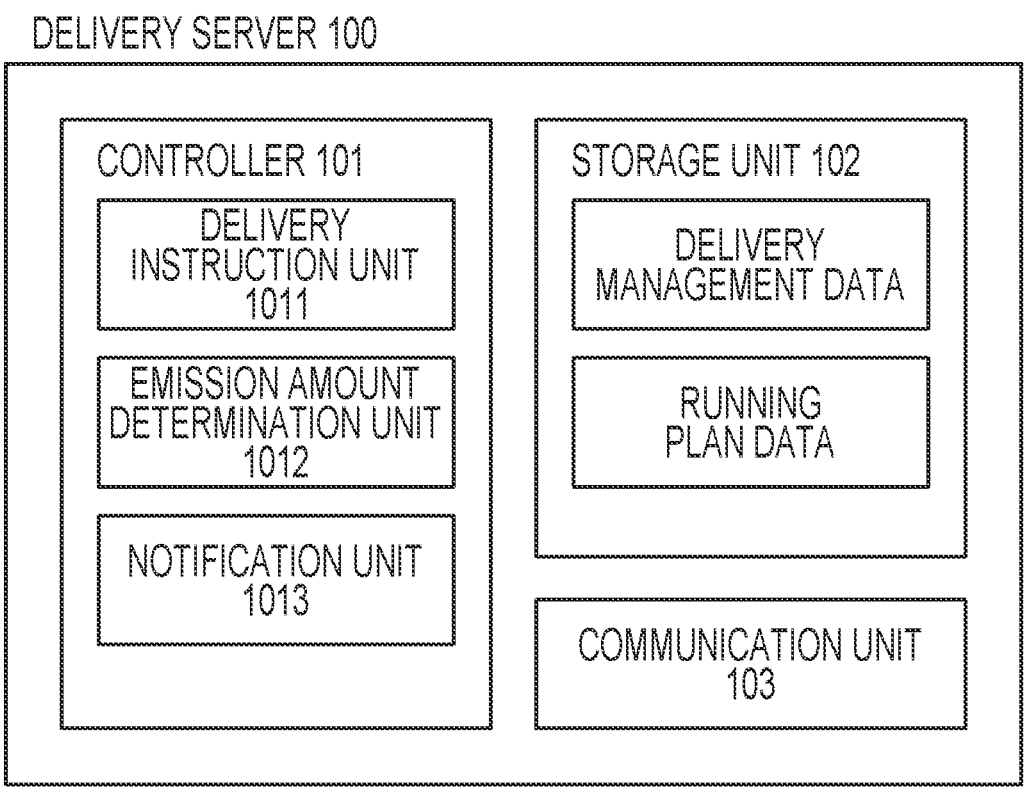
FIG. 5 is a block diagram schematically showing an example of a configuration of a delivery server 100.

Next, the delivery server 100 will be described. FIG. 5 is a system configuration diagram of the delivery server 100 in the first embodiment.

The delivery server 100 is a device that manages the delivery of the package. Specifically, based on the delivery instruction data transmitted from the EC server 300, the delivery server 100 generates an instruction to ship the commodity from a predetermined base and deliver the commodity to a designated delivery destination. In addition, the delivery server 100 manages the running of a plurality of delivery cars, and instructs each of the delivery cars to run for transporting the package, as needed.

The delivery server 100 can be configured by a general-purpose computer. That is, the delivery server 100 can be configured as a computer including a processor, such as a CPU or a GPU, a main storage device, such as a RAM or a ROM, and an auxiliary storage device, such as an EPROM, a hard disk drive, or a removable medium. The removable medium may be, for example, a USB memory or a disk recording medium such as a CD or a DVD. An operating system (OS), various programs, various tables, and the like are stored in the auxiliary storage device, the programs stored in the auxiliary storage device are loaded into a work area of the main storage device and executed, and the constituent units are controlled through the execution of the programs, so that each function that matches a predetermined purpose as described below can be realized. Note that a part or all of the functions may be realized by a hardware circuit, such as an ASIC or an FPGA.

The controller 101 is an arithmetic device that controls the delivery server 100. The controller 101 can be realized by an arithmetic processing device, such as a CPU.

The controller 101 includes three functional modules of a delivery instruction unit 1011, an emission amount determination unit 1012, and a notification unit 1013. Each functional module may be realized by executing the stored program by a CPU.

First, the delivery instruction unit 1011 generates data for managing the delivery of the package based on the delivery instruction data received from the EC server 300.

Figure 6:
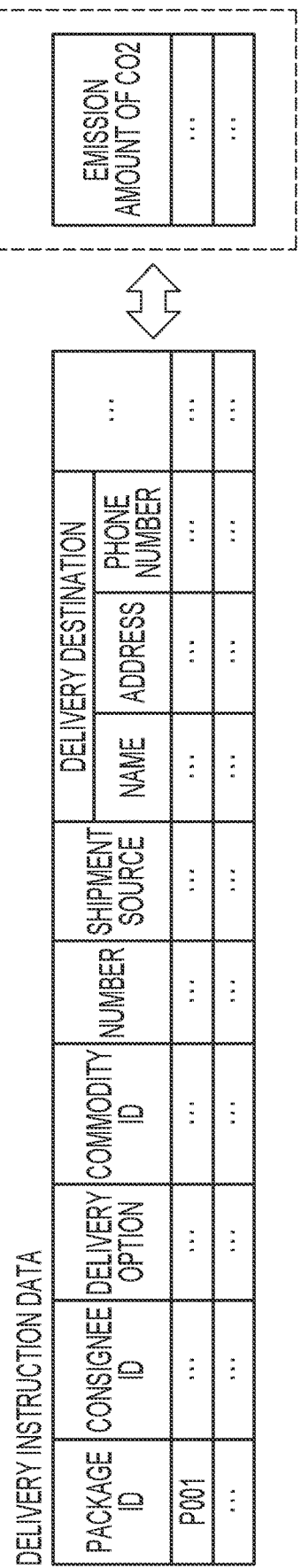
FIG. 6 is an example of delivery management data generated by the delivery server.

FIG. 6 is an example of the data for managing the packages to be delivered to the user (hereinafter, referred to as delivery management data). The delivery management data includes a plurality of records corresponding to individual packages, respectively. The delivery management data includes the identifier of the package (package ID), the identifier of the consignee (consignee ID), a size and weight of the package, an identifier of a delivery business operator (business operator ID), a current position of the package, an identifier of the running (running ID), a status of the package, and the like. The running ID is an identifier for uniquely identifying the running of the delivery car for delivering the package (a series of running in which the delivery car departs from a delivery base, moves around the delivery destination, and returns to the delivery base). Note that, in a case where a plurality of times of running is executed due to the absence of the consignee, a plurality of identifiers may be stored in the running ID. A delivery status of the package (waiting at the base, being delivered, returned due to the absence, waiting for the redelivery, delivery completed, and the like) is stored in the status of the package.

Secondly, the delivery instruction unit 1011 makes a shipment instruction for the package, a running instruction for the delivery car, and the like based on the delivery management data. The delivery of the package can be executed by the delivery cars under management. The shipment instruction for the package is transmitted to a device or the like associated with the distribution center. The running instruction for the delivery car is transmitted to a device or the like associated with the delivery car.

As a result, the package is shipped from the designated distribution center and delivered by the delivery car along a predetermined route.

The delivery instruction unit 1011 generates data for planning the running of the delivery car (hereinafter, referred to as running plan data), and stores the data in a storage unit 102 described below.

FIG. 7 is an example of the running plan data generated by the delivery instruction unit 1011. The running plan data includes an identifier for uniquely identifying the running, the identifier of the delivery business operator, a departure date and time, the identifier of the delivery car, a traveling route of the delivery car, identifiers of the packages loaded on the delivery car, and the like. Note that the running plan data may include a traveling distance of the delivery car (from departure to return) or detailed data related to the vehicle made to run (for example, power, fuel consumption, or electricity consumption of the vehicle). The data can be used to calculate $CO_2$ to be emitted.

The delivery instruction unit 1011 updates the delivery management data in accordance with the delivery status. For example, the current position, the running ID, the status, and the like of the package may be changed in accordance with the delivery status of the package. The delivery instruction unit 1011 may update the current position, the running ID, the status, and the like based on the data received from a terminal owned by a person in charge of the delivery or the terminal provided in the delivery car, data received from another delivery base, or the like. In addition, the traveling route, the traveling distance, and the like of the delivery car may be updated based on a running record of the delivery car.

The emission amount determination unit 1012 calculates the amount of $CO_2$ emitted for transporting one or more packages, for each package.

Here, the amount of $CO_2$ to be emitted due to the consumption behavior of the user will be described. In the present embodiment, the emission amount determination unit 1012 calculates the amount of $CO_2$ to be emitted from the delivery car that delivers the package to the user.

FIG. 8 is a diagram for describing a movement route of the package in a case where the user purchases an item through mail-order sales. As shown in FIG. 8, the commodity purchased by the user is packed at the distribution center and moved to a delivery base A. The package is moved to a nearest delivery base B, and is finally delivered to the user's home.

The amount of $CO_2$ emitted due to the user using the delivery service can be obtained by, for example, dividing the amounts of $CO_2$ emitted in all courses by the total number of the packages (or proportionally dividing the amounts of $CO_2$ emitted in all courses depending on the size and weight of the package), and summing these values.

In the above, for courses A, B, since a large number of the packages are mixed and loaded, the consumption behavior of individual users does not have a large effect on the emission amount of $CO_2$. However, for a course C, $CO_2$ may be able to be suppressed depending on the consumption behavior of the user. FIG. 9 is a diagram showing the traveling route of the delivery car in the course C (that is, last mile delivery). In FIG. 9, a white circle represents the delivery destination of the package.

For example, in a case where a certain user (home is shown with a symbol A) designates a store B (shown with a symbol B) as a place to accept the package, the delivery car does not need to stop by the user's home, so that $CO_2$ to be emitted in the route indicated by a dotted line in FIG. 9 can be reduced. Conversely, in a case where the user is absent from home at a time of the delivery and the redelivery occurs, the delivery car will need to travel again along the route indicated by the dotted line in FIG. 9. That is, since the delivery car is heading to the user's home, extra $CO_2$ is emitted. In addition, for example, in a case where a certain user selects a business operator who executes the delivery using a battery electric vehicle as a business operator who executes the last mile delivery, $CO_2$ corresponding to the entire route can be reduced.

The emission amount determination unit 1012 executes such calculation for each individual package. In the present process, first, based on the running plan data generated by the delivery instruction unit 1011, the emission amount of $CO_2$ for one running of the delivery car is calculated.

Next, the emission amount of $CO_2$ is calculated for each of the packages loaded on the delivery car. The emission amount of $CO_2$ corresponding to the individual package may be obtained by dividing the emission amount of $CO_2$ of the entire delivery car by the total number of the loaded package.

Note that, in a case where geographical positions of a plurality of delivery destinations are not evenly distributed, weighting may be executed based on the geographical positions. For example, in a case where the delivery destination is located in a remote place, a relatively large weight may be given to the corresponding package.

In addition, in a case where the weights or sizes of the packages vary, weight may be executed based on the weight or size. For example, in a case where the weight of a certain package is heavier than other packages, a relatively large weight may be given to the package.

The result obtained by this processing is stored in association with the package. For example, as indicated by the dotted line in FIG. 6, the calculated emission amount of $CO_2$ may be associated with the package and stored in the storage unit 102.

The notification unit 1013 makes the notification to the user based on the calculated emission amount of $CO_2$ corresponding to the individual package. In the present embodiment, by the following method, the notification unit 1013 determines, for each user, whether or not the reduction of the emission amount of $CO_2$ can be realized.

Figure 10A:
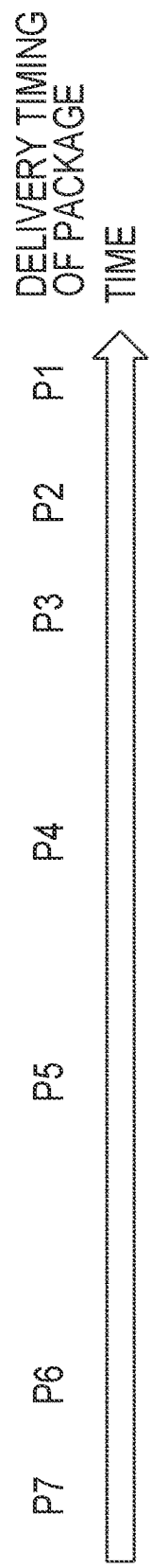
FIG. 10A is a diagram for describing periods for comparing emission amounts.
Figure 10B:
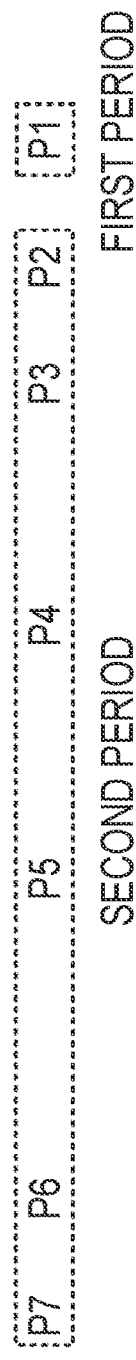
FIG. 10B is a diagram for describing periods for comparing the emission amounts.
Figure 10C:
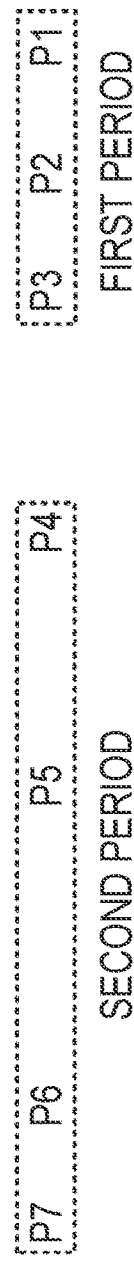
FIG. 10C is a diagram for describing periods for comparing the emission amounts.

(1) Calculate the emission amount of $CO_2$ per package in a most recent predetermined period
(2) Calculate the emission amount of $CO_2$ per package for a past predetermined period
(3) Compare both emission amounts and determine whether or not the emission amount has the reduction tendency FIGS. 10A, 10B, and 10C are diagrams for describing a setting method of the periods. Here, the most recent predetermined period is referred to as the "first period", and the past predetermined period is referred to as the "second period". In the present example, as shown in FIG. 10A, an assumption is made that seven packages P1 to P7 are delivered to a certain user in time series.

The first period is a period including a most recent delivery. In addition, the second period is a period including a delivery that has occurred in the past than the first period. The first period may be a period including solely the most recent delivery (P1), as shown in FIG. 10B. In addition, the first period may be a period (for example, the past one week) including a plurality of deliveries (P1 to P3) including the most recent delivery, as shown in FIG. 10C.

In either case, the second period is a period including the delivery that has occurred in the past than the first period. For example, in a case of the example of FIG. 10B, the second period is a period including deliveries before P2. In the example of FIG. 10C, the second period is a period including deliveries before P4.

How to set the first period and the second period can be appropriately decided according to an operation policy of the system.

For example, in a case where the period is set as shown in FIG. 10B, a determination can be made as to whether or not "the emission amount of $CO_2$ in the one most recent delivery has been reduced as compared with an average value of the emission amounts of $CO_2$ in the past deliveries". In addition, in a case where the period is set as shown in FIG. 10C, a determination can be made as to whether or not "the average value of the emission amounts of $CO_2$ in the deliveries in the most recent one week has been reduced as compared with the average value of the emission amounts of $CO_2$ in the deliveries before the most recent one week".

The notification unit 1013 outputs information for notifying the user that "the emission amount of $CO_2$ has the reduction tendency" based on the emission amount of $CO_2$ corresponding to the first period and the emission amount of $CO_2$ corresponding to the second period.

In the present embodiment, in a case where a determination is made as a result of comparison described above that the emission amount of $CO_2$ has been reduced by a value equal to or more than a predetermined value (for example, equal to or more than 10%), the notification unit 1013 generates a command for printing the label for notifying of the determination. FIG. 11 is a diagram showing a content printed on the label. The fact that the emission amount of $CO_2$ has been reduced, the reduction amount, a comparison target period, or the like may be printed on the label. The label may be printed by a printer connected to the delivery server 100, or may be printed by an external device. The label is attached to the package that is a target and delivered. The label may be attached, for example, to the delivery base B in FIG. 8.

Returning to FIG. 5, the description is continued. The storage unit 102 includes a main storage device and an auxiliary storage device. The main storage device is a memory in which a program executed by the controller 101 or data used in the control program are expanded. The auxiliary storage device is a device in which the program executed by the controller 101 or the data used in the control program is stored.

In addition, the storage unit 102 also stores the delivery management data and the running plan data described above.

The communication unit 103 is a communication interface for connecting the delivery server 100 to the network. The communication unit 103 includes, for example, a network interface board or a wireless communication interface for wireless communication.

Note that the configurations shown in FIGS. 2, 3, and 5 are examples, and all or a part of the shown functions may be executed by using a circuit exclusively designed. In addition, the program may be stored or executed by a combination of the main storage device and the auxiliary storage device other than the configurations shown in FIGS. 2, 4, and 7.

Figure 12:
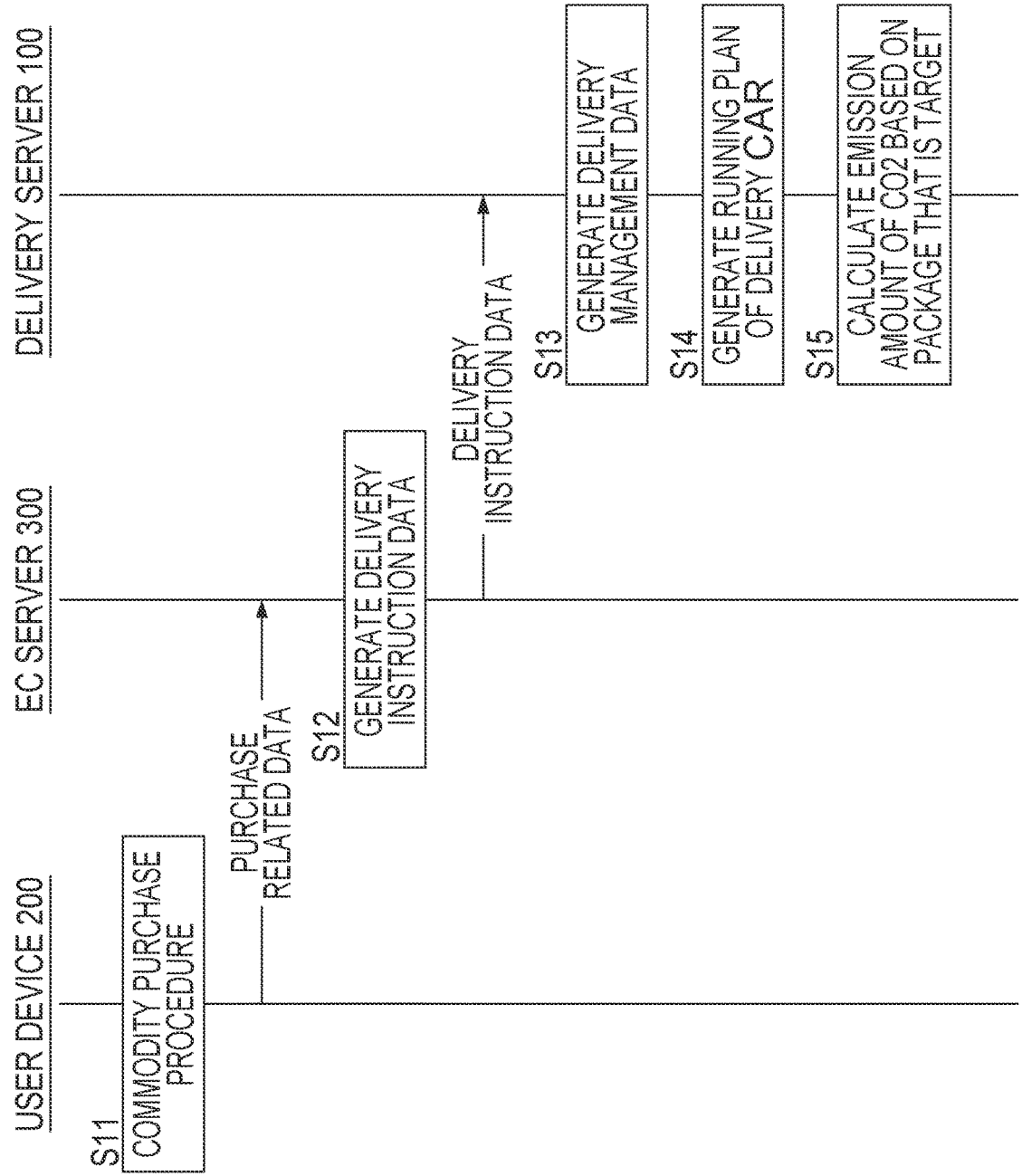
FIG. 12 is a sequence diagram of processing between constituent elements provided in the system.

Next, processing executed by each device provided in the system will be described. FIG. 12 is a sequence diagram of the processing executed by the user device 200, the EC server 300, and the delivery server 100.

First, in step S11, the user accesses the EC server 300 via the user device 200 and executes a commodity purchase procedure. Data related to commodity purchase is transmitted to the EC server 300.

Next, in step S12, the EC server 300 generates the delivery instruction data while accepting the order for the commodity. As described with reference to FIG. 4, the delivery instruction data includes the information on details of the commodity (identifier or the number of the commodities), the shipment source, the delivery destination, and the like. The delivery instruction data is transmitted to the delivery server 100.

In step S13, the delivery server 100 (delivery instruction unit 1011) generates the delivery management data corresponding to the package based on the delivery instruction data.

Next, in step S14, the delivery server 100 (delivery instruction unit 1011) generates a running plan of the delivery car for delivering the package. Note that the present step may be executed when a predetermined cycle has arrived, or when the number of the packages that are the delivery target is equal to or more than a predetermined number. In addition, in a case where there is the delivery car for which the running plan has already been generated, the running plan may be corrected.

Next, in step S15, the delivery server 100 (emission amount determination unit 1012) calculates the emission amount of $CO_2$ for the package that is a target. The emission amount of $CO_2$ corresponding to the individual package can be obtained, for example, by dividing the emission amount of $CO_2$ generated in one running by the number of the loaded packages. Note that, in a case where there is a bias in the weight or size of the package, the emission amount of $CO_2$ may be calculated after giving the weight to the corresponding package. For example, as the weight of the package is heavier, the larger weight may be given. A result of the calculation is stored in the storage unit 102 in association with the package.

Through the processing described above, the emission amount of $CO_2$ generated due to the delivery of the package can be calculated each time the delivery of the package occurs.

Note that, in the present example, solely the emission amount of $CO_2$ for the last mile delivery is used as a calculation target, but the emission amounts of $CO_2$ corresponding to other routes may also be calculated. For example, in a case of the example of FIG. 8, the emission amounts of $CO_2$ to be emitted in the course A and the course B may be calculated. Note that, in a case where the running of transportation means in each course is managed by another device, the data related to the running may be acquired from the device, and the emission amount of $CO_2$ in each course may be calculated based on the data.

Figure 13:
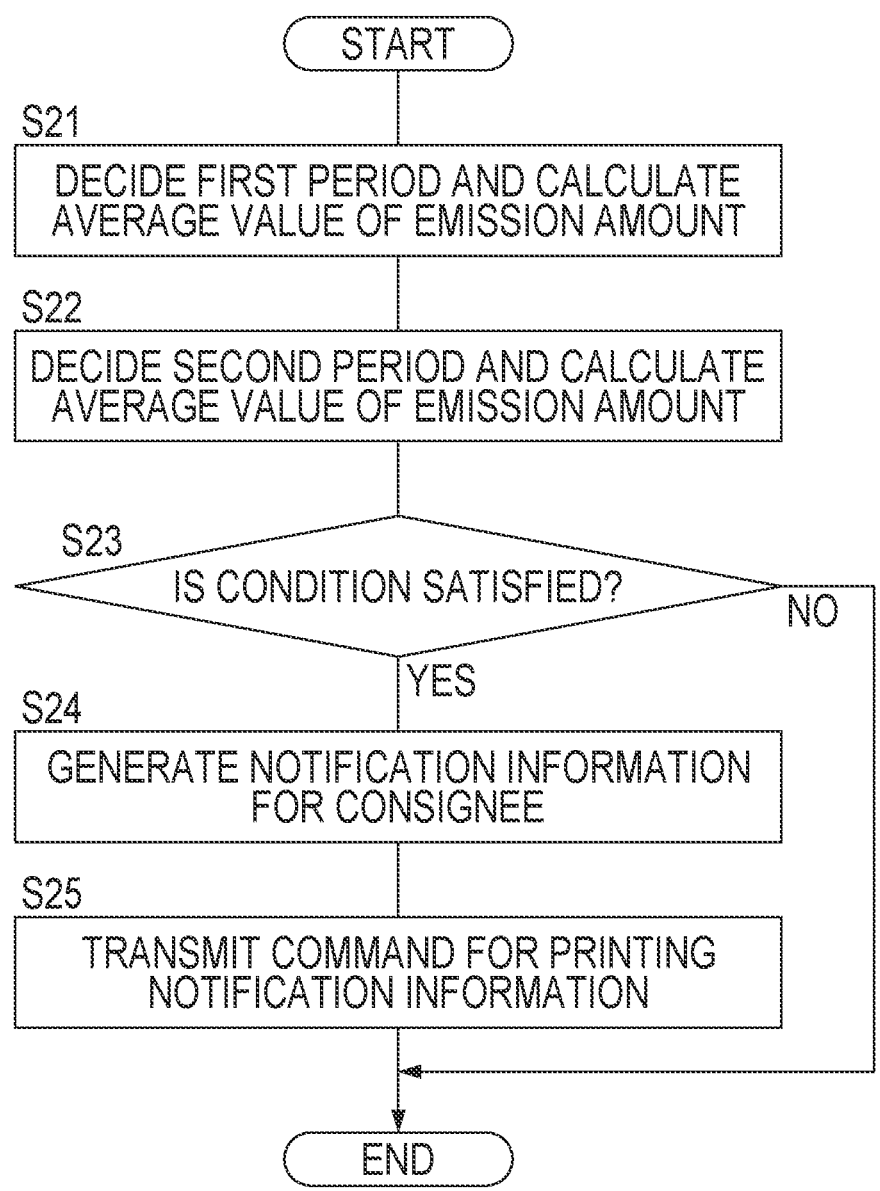
FIG. 13 is a flowchart of processing of generating a notification by the delivery server 100.

Next, processing of notifying the user based on the calculated emission amount of CO2 will be described. FIG. 13 is a flowchart of processing executed by the delivery server 100 (notification unit 1013). The shown processing is executed at a predetermined cycle.

First, in step S21, the first period is decided, and the average value of the emission amounts of CO2 in the first period is calculated. The first period is the period including most recent one or more deliveries. In a case where the first period includes the deliveries, the average value thereof is calculated.

Next, in step S22, the second period is decided, and the average value of the emission amounts of CO2 in the second period is calculated. The second period is a period in the past than the first period. In a case where the second period includes the deliveries, the average value thereof is calculated.

Note that, here, although the average value of the emission amounts of CO2 is calculated, the calculated value is not limited to the average value.

In step S23, a determination is made as to whether or not the average value calculated for each period satisfies a predetermined condition. For example, in a case where the average value of the emission amounts corresponding to the first period has been reduced by a value equal to or more than a predetermined percentage with respect to the average value of the emission amounts corresponding to the second period, a determination may be made that the predetermined condition is satisfied. In a case where a positive determination is made in the present step, the processing proceeds to step S24. In a case where a negative determination is made in the present step, the processing ends.

Note that, here, the average values of the emission amounts of CO2 per package are compared, but the emission amounts of CO2 in a unit period may be compared. For example, the emission amount of CO2 in the most recent one month may be compared with the emission amount of CO2 in the preceding month of the most recent one month. As a result, a determination can be made as to whether or not "the emission amount of CO2 has been reduced by reducing a number of times of use of the mail-order sales".

In step S24, a content of the notification for the consignee is generated. In the present embodiment, since the notification is made by the label, the text to be displayed on the label is generated in the present step. The text to be displayed on the label may include, in addition to a fixed text, a value representing the reduced emission amount of CO2, a text for announcing the comparison target period, and the like.

Next, in step S25, a command for printing the label is generated and transmitted to a printing device. The printed label is attached to the package and delivered.

As described above, the delivery server 100 according to the present embodiment calculates the emission amount of CO2 generated for delivering the package for the predetermined user for each package, and obtains the change tendency of the emission amount in time series. Moreover, in a case where the emission amount has the reduction tendency, relevant notification is made to the user. As a result, the user can recognize that CO2 emission reduction can be achieved due to the change in his/her own consumption behavior.

Note that, in the present embodiment, an example has been described in which the information is directly printed on the label to be attached to the package, but the information to be conveyed to the user does not have to be printed directly on the label. For example, a two-dimensional code in which character information or a URL of a website for conveying the information to the user is encoded may be generated and printed on the label. The user can obtain the information by reading the two-dimensional code by using the user device 200 or the like.

Second Embodiment

In the first embodiment, the delivery server 100 generates the command for printing the label to be attached to the package. In contrast, a second embodiment is an embodiment in which the delivery server 100 makes the notification to the user by transmitting electronic data to the user device 200.

In the second embodiment, the notification unit 1013 of the delivery server 100 generates the electronic data to be transmitted to the user device 200 instead of generating the command for printing the label. The electronic data may be an e-mail or may be data received by a messenger application operated on the user device 200. The electronic data includes information equivalent to the information printed on the label in the first embodiment.

For example, the notification unit 1013 generates the electronic data including the information for announcing the fact that the emission amount of CO2 has been reduced, the reduction amount, the comparison target period, and the like. By transmitting such data to the user device 200, the user can recognize that CO2 emission reduction can be achieved due to the change in his/her own consumption behavior.

Third Embodiment

In the first and second embodiments, as described with reference to FIGS. 10A, 10B, and 10C, the periods are set, and the average values of the emission amounts of CO2 corresponding to all periods are compared. On the other hand, as long as a determination can be made as to whether or not the change in the emission amount of CO2 has the predetermined tendency, other methods can be employed.

In the third embodiment, the emission amount determination unit 1012 executes the following processing instead of executing the processing shown in steps S21 and S22.

First, time-series data of the emission amount of CO2 corresponding to the user is acquired for the predetermined period. FIG. 14 is an example of the time-series data. In the present example, a horizontal axis represents time, and a vertical axis represents the emission amount of CO2. Note that, in the present example, the date and time of the delivery are plotted on the horizontal axis, but intervals between plots may be equal for each delivery.

Next, regression analysis is executed on the time-series data to calculate the change tendency of the emission amount of CO2. The analysis may be executed for the entire period for which the data is held, or may be executed for a part of the period (for example, past six months). As a result, in a case where a regression equation indicating that the emission amount has the reduction tendency is obtained, a determination is made that the condition shown in step S23 is satisfied.

In this way, by analyzing the data related to the emission amount of CO2 given in time series, a determination can also be made as to whether or not the emission amount has the reduction tendency. Note that an analysis method is not limited to the regression analysis as long as a determination can be made as to whether or not the change in the emission amount of CO2 has the predetermined tendency.

Fourth Embodiment

In the first to third embodiments, whether or not the emission amount has the reduction tendency is determined on a user-by-user basis by using the data of the emission amount of CO2 emitted for the package delivered in the past. On the other hand, the condition determined in step S23 is not limited to the increase/reduction tendency of the emission amount as long as the condition is related to the emission amount of CO2.

For example, the emission amount of CO2 of one delivery may be compared with a predetermined threshold value to generate the notification based on a result thereof. For example, the notification may be generated in a case where the emission amount of CO2 of the most recent delivery is less than (more than) the threshold value. The predetermined threshold value may be set by using an average value of the emission amounts of CO2 in the past deliveries (an average value for each region, an average value for each user attribute, an entire average value, or the like).

In addition, in a case where the amount of CO2 to be emitted in one running of the delivery car is less than the threshold value, a determination may be made that all the packages loaded on the delivery car satisfy the condition. When the order for the commodity is placed in the EC site, in a case where the delivery option with less emission amount of CO2 is selected, the emission amount of CO2 associated with the running itself can be reduced by optimizing a delivery time or optimizing the transportation means to be used. Therefore, the user can be notified that such a condition is satisfied. In addition, the notification may be made in a case where the delivery that satisfies the condition continues for a predetermined number of times.

MODIFICATION EXAMPLE

The embodiments described above are merely examples, and the present disclosure can be carried out with appropriate changes within a range not departing from the gist of the present disclosure.

For example, the processing or the means described in the present disclosure can be freely combined and carried out as long as no technical inconsistency occurs.

In addition, although the notification is made to the predetermined user in a case where the emission amount of CO2 has the reduction tendency in the description of the embodiment, conversely, the notification may be made in a case where the emission amount of CO2 has an increase tendency.

In addition, a pattern may be used to classify changes in the emission amount of CO2 in time series, and the notification may be generated based on the result. For example, a determination may made that "the emission amount having the reduction tendency is turned to the increase tendency" or "the emission amount having the increase tendency is turned to the reduction tendency" to generate the corresponding notification.

In addition, in the description of the embodiment, the information is provided to the user in a case where the emission amount of CO2 satisfies the predetermined condition, but processing other than information provision may be executed. For example, processing of giving an incentive to the user can be executed.

In addition, the processing described as being executed by one device may be allocated and executed by a plurality of devices. Alternatively, the processing described as being executed by different devices may be executed by one device. In a computer system, the hardware configuration (server configuration) that realizes each function can be flexibly changed.

The present disclosure can also be realized by supplying a computer program that implements the functions described in the above embodiments to a computer, and reading out and executing the program by one or more processors provided in the computer. Such a computer program may be provided to the computer by a non-transitory computer-readable storage medium that can be connected to a system bus of the computer, or may be provided to the computer via a network. Examples of the non-transitory computer-readable storage medium include any type of disk, such as a magnetic disk (floppy (registered trademark) disk or hard disk drive (HDD)) or an optical disk (CD-ROM, DVD disk, or Blu-ray disk), a read only memory (ROM), a random access memory (RAM), an EPROM, an EEPROM, a magnetic card, a flash memory, an optical card, and any type of medium suitable for storing an electronic instruction.

What is claimed is:

1. An information processing device comprising a controller configured to calculate an emission amount of a greenhouse gas generated by a delivery of a package to a predetermined user based on first data related to the delivery of the package, after receiving delivery instruction to deliver the package, obtain a change tendency of emission amount of the greenhouse gas generated corresponding to the user by accumulating a plurality of the first data and calculating the emission amount of the greenhouse gas generated by the delivery of the package to the user based on each of the first data, determine whether the change tendency of the emission amount of the greenhouse gas satisfies a predetermined criterion, and generate information on the change tendency of the emission amount to be presented to the user in a case where the predetermined criterion is satisfied, wherein the information on the change tendency of the emission amount is information other than the emission amount calculated and the user is notified of the change tendency of the emission amount of the greenhouse gas by the information on the change tendency of the emission amount, wherein the controller is configured to obtain the change tendency of the emission amount of the greenhouse gas corresponding to the user based on an emission amount of the greenhouse gas in a first period corresponding to most recent one or more deliveries and an emission amount of the greenhouse gas in a second period corresponding to one or more deliveries and included in a past predetermined period, and determine that the predetermined criterion is satisfied in a case where the emission amount has a reduction tendency.

2. The information processing device according to claim 1, wherein the controller is configured to obtain the change tendency of the emission amount of the greenhouse gas corresponding to the user in time series.

3. The information processing device according to claim 1, wherein the first data includes running information of a vehicle that delivers the package to the user.

4. The information processing device according to claim 3, wherein the first data includes an emission amount of the greenhouse gas emitted by the vehicle that delivers the package to the user.

5. The information processing device according to claim 3, wherein the controller is configured to further acquire the first data from a server device associated with running of the vehicle.

6. The information processing device according to claim 1, wherein the controller is configured to print a label to be attached to the package to be delivered to the user in a case where the predetermined criterion is satisfied.

7. The information processing device according to claim 6, wherein the label indicates that the emission amount of the greenhouse gas has been reduced by consumption behavior of the user.

8. The information processing device according to claim 1, wherein the controller is configured to transmit the information on the change tendency of the emission amount to a terminal associated with the user in a case where the predetermined criterion is satisfied.

9. The information processing device according to claim 8, wherein the information on the change tendency of the emission amount includes a reduction amount of the greenhouse gas.

10. An information processing method executed by a computer, the information processing method comprising: calculating an emission amount of a greenhouse gas generated by a delivery of a package to a predetermined user based on first data related to a delivery of the package; after receiving delivery instruction to deliver the package; obtaining a change tendency of the emission amount of the greenhouse gas generated corresponding to the user by accumulating a plurality of the first data and calculating the emission amount of the greenhouse gas generated by the delivery of the package to the user based on each of the first data; determining whether the change tendency of the emission amount of the greenhouse gas satisfies a predetermined criterion; and generating information on the change tendency of emission amount to be presented to the user in a case where the predetermined criterion is satisfied, wherein the information on the change tendency of the emission amount is information other than the emission amount calculated, and the user is notified of the change tendency of the emission amount of the greenhouse gas by the information on the change tendency of the emission amount, wherein the change tendency of the emission amount of the greenhouse gas corresponding to the user is obtained based on an emission amount of the greenhouse gas in a first period corresponding to most recent one or more deliveries and an emission amount of the greenhouse gas in a second period corresponding to one or more deliveries and included in a past predetermined period, and a determination is made that the predetermined criterion is satisfied in a case where the emission amount has a reduction tendency.

11. The information processing method according to claim 10, wherein the change tendency of the emission amount of the greenhouse gas corresponding to the user in time series is obtained.

12. The information processing method according to claim 10, wherein the first data includes running information of a vehicle that delivers the package to the user.

13. The information processing method according to claim 12, wherein the first data includes an emission amount of the greenhouse gas emitted by the vehicle that delivers the package to the user.

14. The information processing method according to claim 10, wherein a label to be attached to the package to be delivered to the user is printed in a case where the predetermined criterion is satisfied.

15. The information processing method according to claim 10, wherein the information on the change tendency of the emission amount is transmitted to a terminal associated with the user in a case where the predetermined criterion is satisfied.

16. The information processing method according to claim 15, wherein the information on the change tendency of the emission amount includes a reduction amount of the greenhouse gas.

17. The information processing device according to claim 1, wherein the information on the change tendency of the emission amount to be presented to the user is not generated in a case where the predetermined criterion is not satisfied.

18. The information processing device according to claim 1, wherein the controller instructs a delivery car to run for transporting the package.

* * * * *